(12) United States Patent
Abe et al.

(10) Patent No.: US 7,157,515 B2
(45) Date of Patent: Jan. 2, 2007

(54) RUBBER COMPOSITION FOR MAGNETIC ENCODER

(75) Inventors: Katsumi Abe, Fujisawa (JP); Hironori Nishina, Fujisawa (JP)

(73) Assignee: Nok Corporation, Tokyo (JP)

( * ) Notice: Subject to any disclaimer, the term of this patent is extended or adjusted under 35 U.S.C. 154(b) by 316 days.

(21) Appl. No.: 10/669,970

(22) Filed: Sep. 24, 2003

(65) Prior Publication Data

US 2005/0065258 A1    Mar. 24, 2005

(51) Int. Cl.
*C08K 3/10*    (2006.01)
*C08K 3/22*    (2006.01)
(52) U.S. Cl. .................. 524/435; 524/436; 523/223
(58) Field of Classification Search ................ 524/435, 524/436; 523/223
See application file for complete search history.

(56) References Cited

U.S. PATENT DOCUMENTS 6,870,002 B1*  3/2005  Abe et al. ................... 524/856

2003/0077465 A1*  4/2003  Boudouris et al. .......... 428/469

FOREIGN PATENT DOCUMENTS

JP    2003-183443    * 12/2001

* cited by examiner

*Primary Examiner*—Kriellion Sanders
(74) *Attorney, Agent, or Firm*—Butzel Long

(57) ABSTRACT

A rubber composition for magnetic encoder, which comprises ethylene-methyl acrylate copolymeric rubber, magnetic powder and an amine-based vulcanizing agent, can give molding products with distinguished heat resistance, water resistance and saline water resistance and can be used as effective vulcanization molding materials for magnetic encoder, particularly in use for wheel speed sensor. A higher mixing proportion of the magnetic powder can be added to the rubber component, so the resulting magnetic encoder can have a distinguished magnetic force.

10 Claims, No Drawings

RUBBER COMPOSITION FOR MAGNETIC ENCODER

BACKGROUND OF THE INVENTION

1) Field of the Invention

The present invention relates to a rubber composition for magnetic encoder, and more particularly to a rubber composition for magnetic encoder capable of giving molding product with improved heat resistance, water resistance, saline water resistance, etc.

2) Related Art

Rubber magnets for sensors are used in magnetic encoder at encoder positions of speed sensors, etc. NBR is usually used as a rubber component of rubber magnets in wheel speed sensors, but when applied to positions of driving systems around engines, NBR is exposed to high temperature situations, e.g. about 130°–about 170° C., and thus NBR having an upper limit heat-resistant temperature of about 120° C. cannot withstand such high temperature situations.

On the other hand, rubbers capable of withstanding such high temperature situations of about 130°–about 170° C. include, for example, silicone rubber, fluororubber, etc., but silicone rubber has an oil resistance problem, whereas in the case of fluororubber the rubber flexibility is considerably lost when magnetic powder is filled therein in a high mixing proportion, so the mixing proportion of magnetic powder is limited, that is, there is such a problem that a high magnetic force is hard to obtain.

When wheel speed sensors are applied to positions at an underbody portion of a car including suspensions, wheels, etc., water resistance and saline water resistance properties are further required for the rubber of the rubber magnets, but NBR fails to satisfy these requirements and thus further improvements have been desired.

SUMMARY OF THE INVENTION

An object of the present invention is to provide a rubber composition for magnetic encoder capable of producing molding products with distinguished heat resistance, water resistance, saline water resistance, etc. and further with a higher magnetic force due to increased mixing proportion of magnetic powder.

The object of the present invention can be attained by a rubber composition for magnetic encoder, which comprises ethylene-methyl acrylate copolymer rubber, magnetic powder and an amine-based vulcanizing agent.

DETAILED DESCRIPTION OF THE INVENTION

Various ethylene-methyl acrylate copolymer rubbers (AEM) are commercially available, and thus any copolymer rubber, for example, Vamac G, Vamac GLS, Vamac HG (du Pont-Dow elastomer products), etc. can be used as such.

Vulcanization system for the ethylene-methyl acrylate copolymer rubber can be classified into two major groups, i.e. amine vulcanization system and peroxide vulcanization system. In the present rubber composition, a higher mixing proportion, e.g. about 300–about 1,000 parts by weight, of magnetic powder is added to 100 parts by weight of the copolymer rubber, and particularly when about 500 parts by weight or more of the magnetic powder is added thereto, it is preferable to use an amine-based vulcanizing agent, because the peroxide vulcanization system has such a possibility that decomposition gases of unreacted peroxide generated in the stage of vulcanization are highly liable to remain in the vulcanized rubber to develop foams.

The amine-based vulcanizing agent can be used in a proportion of about 0.5–about 5 parts by weight, preferably about 1–about 3 parts by weight, to 100 parts by weight of the copolymer rubber, and includes aliphatic and aromatic amine-based vulcanizing agents such as hexamethylenediamine carbamate, N,N'-dicynamylidene-1,6-hexanediamine and 4,4'-methylenebis(cyclohexylamine) carbamate.

Magnetic powder for use in the present invention includes ferrite magnetic powder and/or rare earth metal magnetic powder, each having particle sizes of usually about 0.5–about 10 μm. Ferrite magnetic powder is used from the viewpoints of cost and adhesiveness to the rubber, though the magnetic force is lower than those of the rare earth metal magnetic powder. Among the ferrite magnetic powder, strontium ferrite powder and barium ferrite powder are more preferable from the viewpoint of magnetic force. The magnetic powder is formed into test pieces by adding 1.5 ml of an aqueous 5 wt. % polyvinyl alcohol solution to 20 g of the magnetic powder and placing the mixture in a cylindrical mold, 25.4 mm in diameter, followed by pressure molding under pressure of 1 ton/cm$^2$. The test pieces are subjected to determination of residual magnetic flux density Br and coercive force iHc by a direct current magnetization meter. It is preferable to use magnetic powder having a Br value of 1,600 G or more, and an iHc value of 3,000 Oe or more, when pressure molded.

The magnetic powder can be used in a mixing proportion of about 300–about 1,000 parts by weight, preferably about 400–about 900 parts by weight, to 100 parts by weight of the copolymer rubber. Below about 300 parts by weight, magnetic force for the encoder is not satisfactory, whereas above 1,000 parts by weight, the flexibility of vulcanization molding products will be deteriorated.

Besides the above-mentioned essential components, the rubber composition can contain, if desired, a reinforcing agent typically represented by carbon black, an antioxidant, a plasticizer, a processing aid, vulcanization aid, etc. The rubber composition is kneaded by an internal mixer and an open roll, etc., and the kneading product is molded at about 150°–about 200° C. for about ½–about 60 minutes by pressure molding processes such as injection molding, compression molding, transfer molding, etc.

Molding process involves vulcanization bonding to a metal plate acting as an encoder support ring, such as stainless steel plate, cold rolled steel plate, etc., and thus it is preferable to apply a commercially available adhesive of phenol resin series, epoxy resin series, silane series, etc. to the surface of the metal plate to be bonded before the vulcanization bonding.

The present rubber composition for magnetic encoder can provide molding products with distinguished heat resistance, water resistance and saline water resistance, and thus can provide effective vulcanization molding materials for magnetic encoder, particularly for use in wheel speed sensors. Furthermore, a higher mixing proportion of magnetic powder can be added to the rubber component, encoder distinguished in the magnetic force can be obtained.

PREFERRED EMBODIMENTS OF THE INVENTION

The present invention will be described in detail below, referring to Examples and Comparative Example.

EXAMPLE 1

| | Parts by weight |
|---|---|
| AEM (Vamac G, du Pont-Dow elastomer product) | 100 |
| Strontium ferrite powder (FH-801, Toda Kogyo Product: particle size 0.5~3.0 μm, average particle size 1.2 μm) | 700 |
| Stearic acid | 2 |
| Antioxidant (Nocrack CD, Ouchi-Shinko Kagaku product) | 2 |
| Plasticizer (RS735, Asahi Denka product) | 10 |
| Vulcanization aid (Nocceler DT, Ouchi-Shinko Kagaku product) | 4 |
| Vulcaniging agent (Diak No.1, DuPont-Dow elastomer product) | 2 |

The foregoing components were kneaded in an internal mixer and an open roll, and the resulting kneaded mixture was compression molded at 170° C. for 15 minutes to obtain 2 mm thick vulcanization sheets.

The vulcanization sheets were subjected to determination of the following items:
- Normal state physical properties: determined according to JIS K-6251 and 6253
- Air-heated aging test: determined by heating at 150° C. or 175° C. for 70 hours, according to JIS K-6257
- Dipping test: determined by dipping into water or aqueous 3 wt. % sodium chloride solution at 70° C. for 70 hours, according to JIS K-6358
- Adhesiveness test: determined by dipping into water or aqueous 3 wt. % sodium chloride solution at 70° C. for 500 hours to obtain percent rubber retention (R), according to JIS K-6256
- Magnetism test: minimum value at the center of a test piece, 2 mm thick and 29 mm in diameter by a handy Gaussmeter (magnetized at 2 kv-1200 μF)

EXAMPLE 2

In Example 1, the same amount of Vamac GLS, du Pont-Dow elastomer product, was used as AEM in place of Vamac G.

COMPARATIVE EXAMPLE

| | Parts by weight |
|---|---|
| NBR (N241H, Japan Synthetic Rubber product) | 100 |
| Strontium ferrite powder (FH-801) | 700 |
| Stearic acid | 2 |
| Antioxidant (Nocrack CD) | 2 |
| Plasticizer (RS735) | 10 |
| Activated zinc powder | 3 |
| Sulfur | 0.8 |
| Vulcanization aid (Nocceler TT, Ouchi-Shinko Kagaku product) | 2 |
| Vulcanization aid (Nocceler CZ, Ouchi-Shinko Kagaku product) | 1 |

The foregoing components were subjected to kneading, vulcanization and determination tests in the same manner as in Example 1.

Results of determination in Examples 1 and 2 and Comparative Example are shown in the following Table.

TABLE

| Determination item | Ex. 1 | Ex. 2 | Comp. Ex. |
|---|---|---|---|
| [Normal state physical properties] | | | |
| Hardness (Duro A) | 90 | 90 | 86 |
| Tensile strength (MPa) | 4.1 | 4.3 | 2.4 |
| Elongation (%) | 70 | 60 | 120 |
| [Air-heated aging test] | | | |
| (150° C., 70 hrs) | | | |
| Change in hardness (points) | +4 | +5 | +12 |
| Percent tensile strength change (%) | +49 | +52 | ✕ |
| Percent elongation change (%) | −26 | −30 | ✕ |
| (175° C., 70 hrs) | | | |
| Change in hardness (points) | +7 | +7 | — |
| Percent tensile strength change (%) | +63 | +58 | — |
| Percent elongation change (%) | −32 | −14 | — |
| [Dipping test] | | | |
| (water) | | | |
| Change in hardness (points) | −5 | −5 | −7 |
| Percent tensile strength change (%) | −25 | −32 | −27 |
| Percent elongation change (%) | +28 | +53 | +82 |
| Percent volume change (%) | +3.5 | +7.1 | +6.4 |
| Surface roughening | none | none | occurred |
| (Aqueous 3 wt. % NaCl solution) | | | |
| Change in hardness (points) | −2 | −1 | −1 |
| Percent tensile strength change (%) | −17 | −21 | −11 |
| Percent elongation change (%) | +2 | +10 | −5 |
| Percent volume change (%) | +2.9 | +5.5 | +3.4 |
| Surface roughening | none | none | none |
| [Adhesiveness test] | | | |
| water (R; percent rubber retention) | 100 | 100 | 80 |
| Aqueous 3 wt. % NaCl solution) (R; percent rubber retention) | 100 | 100 | 70 |
| [Magnetism test] | | | |
| Magnetic force (G) | 102 | 101 | 102 |

(Remark) ✕: found undeterminable due to bending fracture

What is claimed is:

1. A rubber composition for magnetic encoder, which comprises ethylene-methyl acrylate copolymer rubber, magnetic powder and an amine-based vulcanizing agent.

2. A rubber composition for magnetic encoder, which comprises 100 parts by weight of ethylene-methyl acrylate copolymer rubber, 300–1,000 parts by weight of magnetic powder and 0.5–5 parts by weight of an amine-based vulcanizing agent.

3. A rubber composition for magnetic encoder according to claim 1, wherein the magnetic powder is ferrite magnetic powder or rare earth metal magnetic powder, having a particle size of 0.5–10 µm.

4. A rubber composition for magnetic encoder according to claim 3, wherein the magnetic powder is strontium ferrite magnetic powder or barium ferrite magnetic powder.

5. A magnetic encoder obtained by vulcanization molding a rubber composition according to claim 1.

6. A magnetic encoder according to claim 5 in combination with a wheel speed sensor.

7. A rubber composition for magnetic encoder according to claim 2, wherein the magnetic powder is ferrite magnetic powder or rare earth metal magnetic powder, having a particle size of 0.5–10 µm.

8. A rubber composition for magnetic encoder according to claim 7, wherein the magnetic powder is strontium ferrite magnetic powder or barium ferrite magnetic powder.

9. A magnetic encoder obtained by vulcanization molding a rubber composition according to claim 2.

10. A magnetic encoder according to claim 9 in combination with a wheel speed sensor.

* * * * *

UNITED STATES PATENT AND TRADEMARK OFFICE
CERTIFICATE OF CORRECTION

PATENT NO. : 7,157,515 B2
APPLICATION NO. : 10/669970
DATED : January 2, 2007
INVENTOR(S) : Katsumi Abe and Hironori Nishina It is certified that error appears in the above-identified patent and that said Letters Patent is hereby corrected as shown below:

Title Page, Item (73) Assignee:
Assignee name should be changed from
    "Nok Corporation"
to
    --NOK Corporation--

Column 3,
Line 22, should be changed from
    "Vulcaniging agent (Diak No. 1, DuPont-Dow elastomer"
to
    --Vulcanizing agent (Diak No. 1, DuPont-Dow elastomer--

Signed and Sealed this

Twenty-second Day of May, 2007

JON W. DUDAS
*Director of the United States Patent and Trademark Office*